(12) United States Patent
Kwak (10) Patent No.: US 8,054,897 B2
(45) Date of Patent: Nov. 8, 2011

(54) UWB RECEIVER SCALING CLOCK FREQUENCY BY DATA RATE AND DATA RECEPTION METHOD THEREOF

(75) Inventor: Jae-Young Kwak, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 835 days.

(21) Appl. No.: 12/071,962

(22) Filed: Feb. 28, 2008

(65) Prior Publication Data

US 2008/0205569 A1 Aug. 28, 2008

(30) Foreign Application Priority Data

Feb. 28, 2007 (KR) .................. 10-2007-0020419

(51) Int. Cl.
*H04K 1/10* (2006.01)
*H04L 27/28* (2006.01)

(52) U.S. Cl. ........ 375/260; 375/371; 375/262; 375/265; 375/341

(58) Field of Classification Search .......... 375/260, 375/371, 262, 265, 261, 341, 340, 354
See application file for complete search history.

(56) References Cited

U.S. PATENT DOCUMENTS

| | | | |
|---|---|---|---|
| 6,615,388 B1 * | 9/2003 | Takamichi | 714/795 |
| 6,728,926 B1 * | 4/2004 | Kakemizu et al. | 714/789 |
| 7,440,392 B2 * | 10/2008 | Hwang et al. | 370/208 |
| 2005/0276310 A1 | 12/2005 | Choi et al. | |
| 2006/0002488 A1 | 1/2006 | Asanuma | |
| 2006/0176968 A1 * | 8/2006 | Keaney et al. | 375/260 |

FOREIGN PATENT DOCUMENTS

| | | |
|---|---|---|
| JP | 2005-354682 | 12/2005 |
| JP | 2006-019949 | 1/2006 |
| KR | 10-2001-0016939 | 8/1999 |
| KR | 10-2001-0059443 | 7/2001 |
| KR | 10-2002-0084462 | 11/2002 |
| KR | 10-2003-0082103 | 10/2003 |
| KR | 1020050052021 | 6/2005 |
| KR | 1020050117098 | 12/2005 |

* cited by examiner

*Primary Examiner* — Phuong Phu (74) *Attorney, Agent, or Firm* — Harness, Dickey & Pierce, P.L.C.

(57) ABSTRACT

A method for demodulating an ultra-wide band (UWB) signal includes detecting a detecting a data rate of the UWB signal, selecting one from plurality of clock signals in response to the detected data rate, decoding the UWB signal in accordance with the selected clock signal, and outputting transmission data determined by a fast clock. The plurality of clock signals includes at least one frequency different from other frequencies. A receiver for an UWB signal includes an OFDM demodulating unit demodulating the UWB signal into an OFDM symbol, and a bit-level processing unit demodulating the OFDM symbol into bit-level data. The bit-level processing unit receives a scaled clock signal having a frequency corresponding to one of a plurality of data rates of the UWB signal. The method and apparatus may reduce static power consumption and improve performance of the receiver.

17 Claims, 6 Drawing Sheets

Fig. 1

(CONVENTIONAL ART)

(CONVENTIONAL ART)

| Data Rate (Mbps) | Modultion | Code Rate (R) | Coded Bits / 6-OFDM Symbol | Info Bits / 6-OFDM Symbol |
|---|---|---|---|---|
| 53.3 | QPSK | 1/3 | 300 | 100 |
| 80 | QPSK | 1/2 | 300 | 150 |
| 106.7 | QPSK | 1/3 | 600 | 200 |
| 160 | QPSK | 1/2 | 600 | 300 |
| 200 | QPSK | 5/8 | 600 | 375 |
| 320 | DCM | 1/2 | 1200 | 600 |
| 400 | DCM | 5/8 | 1200 | 750 |
| 480 | DCM | 3/4 | 1200 | 900 |

| Data Rate (Mbps) | Code Rate (R) | Coded Bits / 6-OFDM Symbol | Info Bits / 6-OFDM Symbol | Frequency of CLK_DS(MHz) |
|---|---|---|---|---|
| 53.3 | 1/3 | 300 | 100 | 16.5(1/8) |
| 80 | 1/2 | 300 | 150 | 33(1/4) |
| 106.7 | 1/3 | 600 | 200 | 33(1/4) |
| 160 | 1/2 | 600 | 300 | 66(1/2) |
| 200 | 5/8 | 600 | 375 | 66(1/2) |
| 320 | 1/2 | 1200 | 600 | 132 |
| 400 | 5/8 | 1200 | 750 | 132 |
| 480 | 3/4 | 1200 | 900 | 132 |

Fig. 6

UWB RECEIVER SCALING CLOCK FREQUENCY BY DATA RATE AND DATA RECEPTION METHOD THEREOF

PRIORITY STATEMENT

This U.S. non-provisional patent application claims the benefit of Korean Patent Application No. 10-2007-20419, filed on Feb. 28, 2007, in the Korean Intellectual Property Office, the disclosure of which is incorporated herein in this entirety by reference.

BACKGROUND

1. Field

Example embodiments relate to a radio transmitter-receiver system, for example, to a method and apparatus for managing clock signals in an ultra-wide band (UWB) reception system.

2. Description of the Related Art

A UWB reception system is a type radio technology that enables data transmission in ultrahigh frequency with relatively low power. The UWM system may effectively utilize frequency resources by sharing frequency spectrums of traditional communication systems, thereby providing increased reliability. The characteristics of low power and increased reliability may make UWB technology ideal for radio frequency sensitive environments, such as, collision protecting equipment for flying objects, an altimeter measuring an altitude from the ground at an aviation facility and an airplane, and position chase, for example. Moreover, UWB technology is used in the field of medical science, for monitoring patients' conditions, and examining the physical condition of embryos, for example. Because a conventional UWB system generally uses an ultrahigh bandwidth, interference with radio frequencies used in a global positioning system (GPS) and mobile communication networks may cause problems. Therefore, the U.S. Federal Communications Commission (FCC) tightly controls the commercial utilization of UWB, but recently has allowed UWB technology to be commercial available under certain conditions.

The FCC defines the UWB system as a communication mode occupying a frequency bandwidth over 500 MHz or 20% of a center frequency. Presently, the FCC provides a limitation regarding transmission signal power to the frequency band of 3.1~10.6 GHz for communication. Because a UWB signal operates in a wide frequency band, it may have a relatively small value of power spectral density in a frequency domain. Due to the low power spectral density, the UWM system under FCC regulation may have relatively minor interference problems with other communication signals. Previous conventional UWB technologies utilized short pulses within a broadband, but now Multi-Band Orthogonal Frequency-Division Multiplexing (MB-OFDM) and direct sequence UWB (DS-UWB) modes may be considered ideal for the IEEE P802.15.3a UWB communication standard. The MB-OFDM mode may utilize Time-Frequency (TF) hopping patterns for offering a multiple Simultaneous Operating Piconet (multi-SOP) by satisfying the transmission signal power provision proposed by the FCC to minimize power consumption.

The conventional MB-OFDM mode differs from the traditional OFDM mode because the frequency in a MB-FDM mode may be modified every OFDM symbol in accordance with TF hopping pattern. The conventional MB-OFDM mode and the traditional OFDM mode are similar because the MB-OFDM or OFDM mode may operate to transmit data in parallel by sub-carriers. Therefore, the UWB system with the MB-OFDM mode may be sensitive to a sub-carrier offset similar to a single carrier transmission system. In other words, if there is a sub-carrier frequency offset between a transmitter and a receiver, it may degrade the orthogonality between sub-carrier waves, thereby inducing Inter-Carrier Interference (ICI).

Within the UWB radio communication system, the standardization of the IEEE P802.15.3a provision may be progressing towards ultrahigh-speed radio data transmission of 480 Mbps in a close distance of 3 meters.

Figure 1:
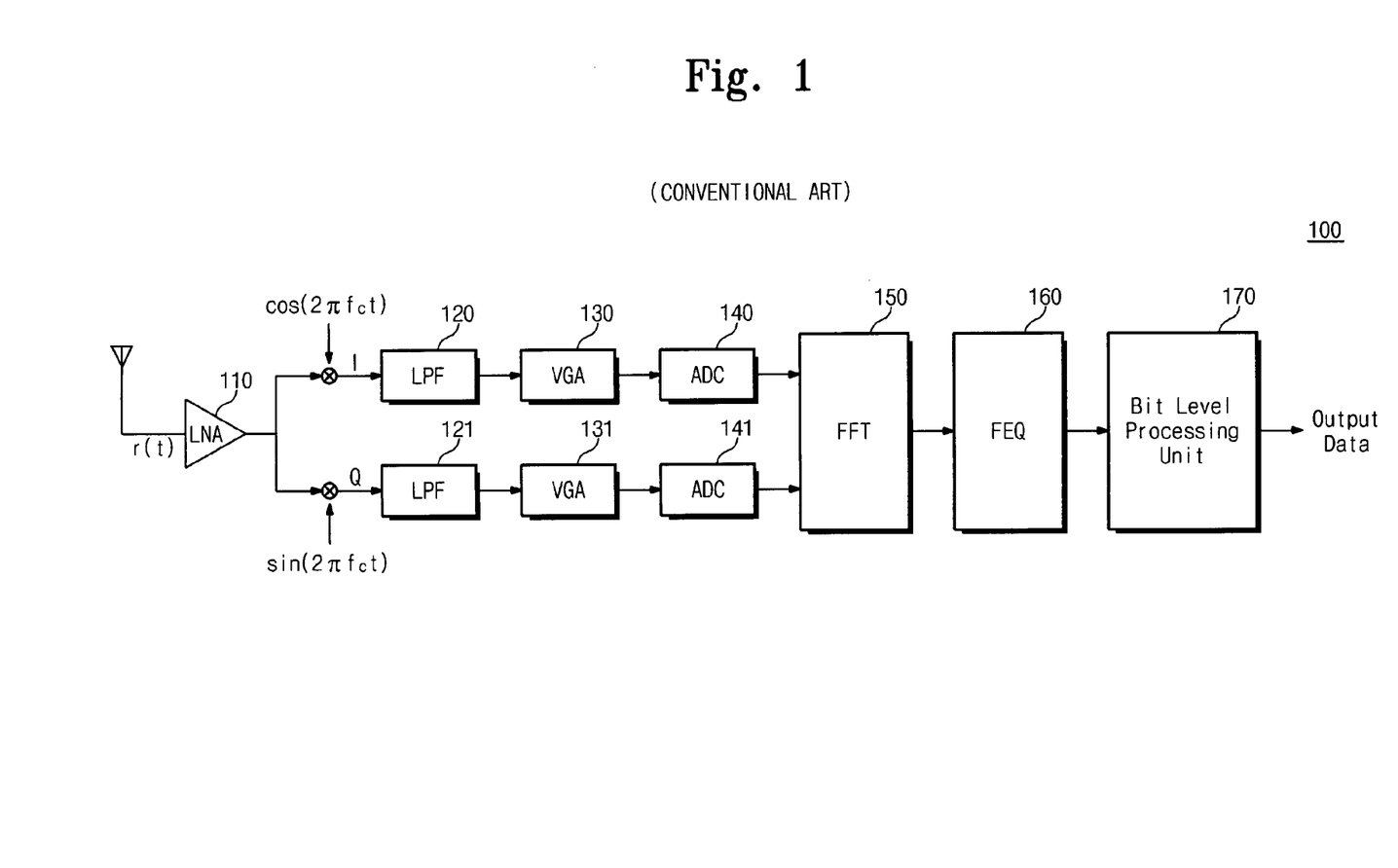
FIG. 1 is a block diagram illustrating a conventional UWM receiver operating in MB-OFDM mode.

FIG. 1 is a block diagram illustrating a conventional UWB receiver 100 operating in MB-OFDM mode. Referring to FIG. 1, the UWB receiver 100 may receive a signal r(t) through an antenna. An amplifier (LNA) 110 may amplify the received signal r(t). The amplified received signal may be divided into inphase I and quadrature Q components by using cosine and sine waves at the carrier frequency domain. The inphase I component may be converted into a digital signal through a low pass filter (LPF) 120, a voltage gain amplifier (VGA) 130, and an analog-to-digital converter (ADC) 140. Similarly, the quadrature Q may be converted into a digital signal through a low pass filter (LPF) 121, a voltage gain amplifier (VGA) 131, and an analog-to-digital converter (ADC) 141. The inphase I and quadrature Q components may be applied to a fast Fourier transformer (FFT) 150 and a frequency equalizer (FEQ) 160 to decode the digital signals in OFDM code or symbols. The FFT 150 and the FEQ 160 maybe operable in OFDM baseband. Furthermore, the frequency and time equalizer may be activated in the OFDM baseband block.

The OFDM coded symbol signal from the FFT 150 and FEQ 160 may be applied to a bit-level processing unit 170. After the OFDM coded symbol signal is processed, the output from the bit-level processing unit 170 may be a bit level data chain. Processing the OFDM coded signals in the bit-level processing unit 170 may include de-interleaving, de-puncturing, and Viterbi decoding operations. The UWB system may include a 6-OFDM mode, where processing the OFDM coded signals may be executed in the unit of 6 symbols (interleaving depth). After the OFDM coded signals are processed, the bit-level processing unit 170 generates an output data chain or Output Data.

Figure 2:
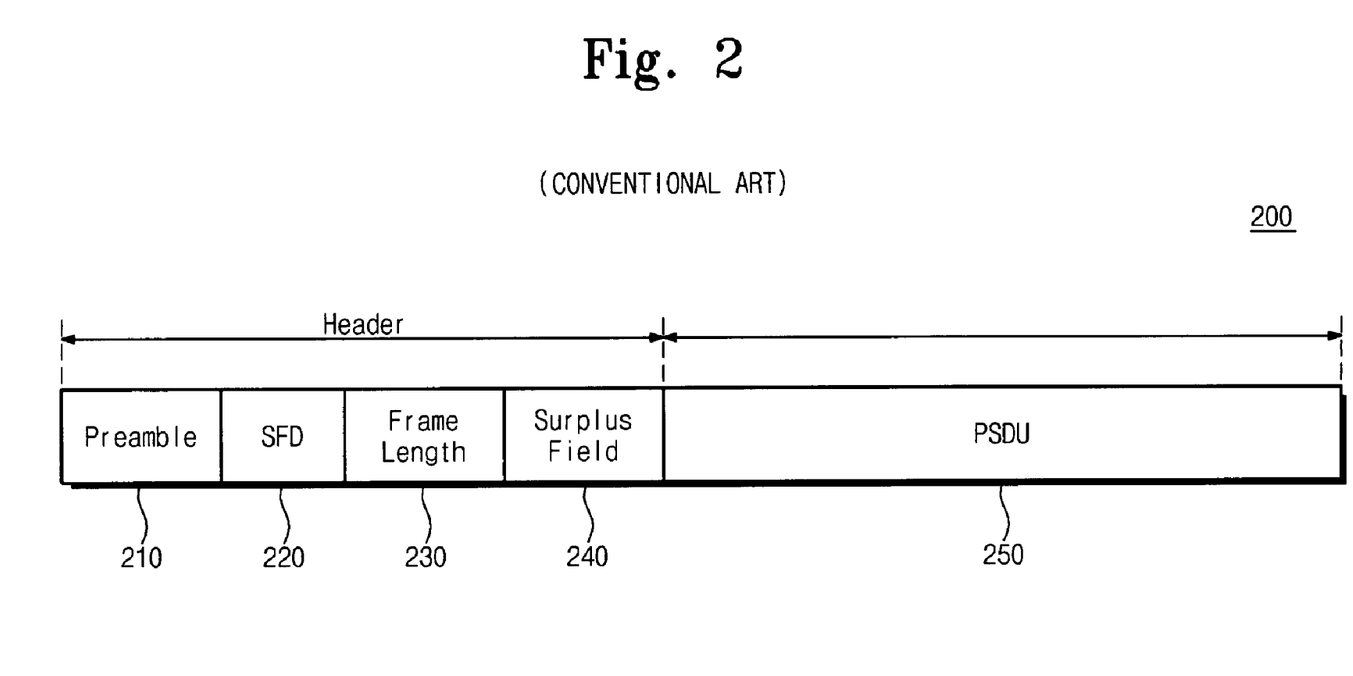
FIG. 2 illustrates a frame structure of a 6-OFDM data of a conventional UWB data packet.

FIG. 2 illustrates a frame structure of 6-OFDM data of a conventional UWB data packet. Referring to FIG. 2, the frame of a 6-OFDM data packet 200 may be divided into a header and a physical layer service data unit (PSDU) 250. The header may include general information for receiving the PSDU 250. The PSDU 250 may include information to be transmitted. The header may include a preamble 210, a start frame delimiter (SFD) 220, a frame length sign 230, and a surplus field 240. The preamble 210 may indicate the synchronization. The SFD 220 may indicate an end of the preamble 210. The frame length sign 230 may indicate a length of the PSDU 250. In a conventional 6-OFDM system, the header may include approximately 256 bytes and the PSDU 250 may include approximately 0 to 4095 bytes. In the 6-OFDM receiver, a demodulation method and a code rate may be modified in accordance with a transmission speed or data rate of the PSDU 250.

Figure 3:
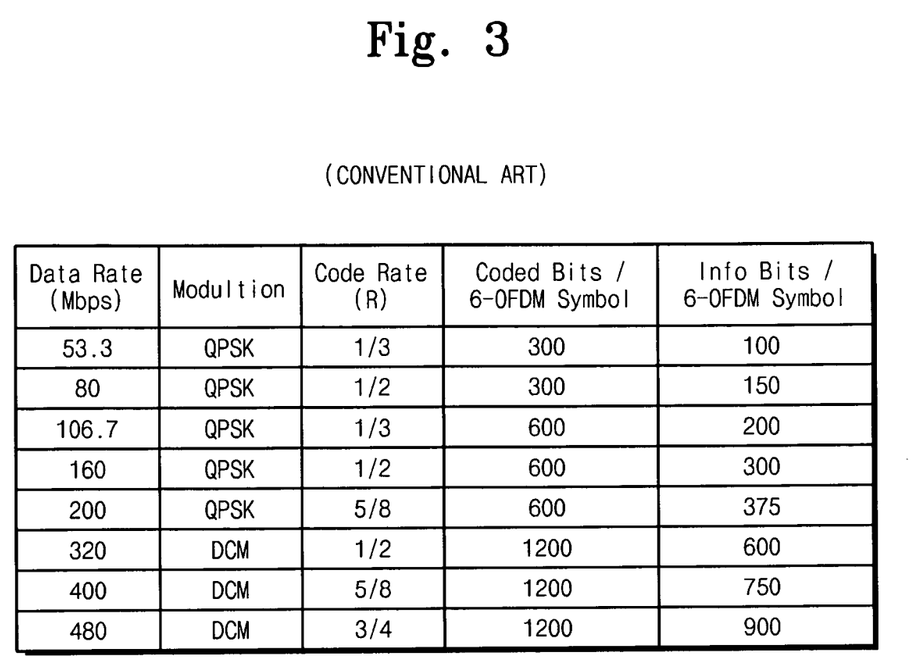
FIG. 3 illustrates parameters of a conventional receiver according to data rates of PSDU.

FIG. 3 illustrates parameters of a conventional receiver according to data rates of the PSDU. Referring to FIG. 3, when the data rate of the PSDU 250 is over 320 Mbps, the 6-OFDM system may utilize Dual-Carrier Modulation (DCM) as a modulation mode. When the data rate of the PSDU 250 is under 320 Mbps, the 6-OFDM system may utilize Quadrature Phase Shift Keying (QPSK) as a modulation mode. By utilizing duel modulation modes, the 6-OFDM system may operate with frequency diversity in the environment of selective frequency fading.

Referring to FIG. 3, the 6-OFDM system may operate according to eight data rates or data transmission rate modes. Because the receiver must support all data process operations (e.g., de-interleaving, de-puncturing, Viterbi decoding), the receiver may operate at a relatively high rate of speed, regardless of the eight data transmission rate modes. Consequently, the receiver may require a high frequency clock for supporting such a high data transmission rate. For example, the frequency of a drive clock of the bit-level processing unit 170 may be fixed to a designed value regardless of a data transmission rate. The designated value may be supplied to permit the maximum data transmission speed. Therefore, all function blocks of the receiver may be driven by a clock frequency of 132 MHz to support the maximum data rate of 480 Mbps. Because the receiver may require a high clock frequency for supporting the fast data transmission rate, the receiver may dissipate a relatively high amount of power. The bit-level processing unit 170 subsequent to the OFDM demodulation stage may dissipate power around 40% of the whole power consumption in the receiver.

During an idle time of the bit level processing unit, static power consumption may remain due to leakage currents of clock paths. For example, in a relatively low data transmission rate of the PSDU, the bit-level processing unit 170 may conduct a faster operation relative to the other function blocks because the clock frequency is operating may be 132 MHz. Therefore, an idle time of operation may exist in the bit-level processing unit 170, whereby static power consumption may still remain. The static and dynamic power consumption may act as a large factor of power dissipation in the UWB system.

SUMMARY

Example embodiments of the present application may reduce static power consumption caused by the fixed clock frequency of the traditional receiver.

Example embodiments provide a method and apparatus for managing clock signals in an UWB reception system. The method includes detecting a data rate of the UWB signal, selecting one from a plurality of clock signals in response to the detected data rate, wherein the plurality of clock signals includes at least one frequency different from other frequencies, decoding the UWB signal in accordance with the selected clock signal, and outputting transmission data determined by a fast clock. The UWB signal may be modulated in multi-band OFDM mode, and 6-OFDM mode. Decoding the UWM signal may include de-interleaving the UWB signal, de-puncturing the de-interleaved data, and decoding the de-punctured data in accordance with a Viterbi algorithm.

According to at least one example embodiment, a receiver for an UWB signal may include an OFDM demodulating unit configured to demodulate the UWB signal into an OFDM symbol, a bit-level processing unit demodulating the OFDM symbol into bit-level data. The bit-level processing unit may be driven by a scaled clock having a frequency corresponding to one of a plurality of data rates of the UWB signal. The OFDM demodulation unit may be driven by a fast clock having a frequency corresponding to a maximum data rate of the plurality of data rates of the UWB signal.

According to at least one example embodiment, the receiver may include a clock regulator generating the scaled clock from one of a plurality of clock signals corresponding to one of the plurality of data rates. The plurality of data rates may include 53.3 Mbps, 80 Mbps, 106.7 Mbps, 160 Mbps, 200 Mbps, 320 Mbps, 400 Mbps, and 480 Mbps. The fast clock may include a frequency of 132 MHz. The clock regulator may output the scaled clock of 16.5 MHz if the data rate is 53.3 Mbps, the scaled clock of 33 MHz if the data rates are 80 Mbps and 106.7 Mbps, the scaled clock of 66 MHz if the data rates are 160 Mbps and 200 Mbps, and the scaled clock of 132 MHz if the data rates are 320 Mbps, 400 Mbps, and 480 Mbps.

According to at least one example embodiment, the bit-level processing unit may include a de-interleaver operating to de-interleave the OFDM symbol, a de-puncturer operating to decompress de-interleaved data, and a Viterbi decoder operating to decode data decompressed. The de-interleaver may receive the OFDM symbol in response to the fast clock and may output the de-interleaved data in response to the scaled clock. The de-interleaver may include a first memory storing the OFDM symbol in response to the fact clock and outputting the de-interleaved data in response to the scaled clock. The de-interleaver may be a static random access memory.

According to at least one example embodiment, the Viterbi decoder may include a branch metric unit generating a branch metric, a path metric unit generating a path metric, and a trace back unit determining transmission data. The branch metric and the path metric may be generated by the scaled clock. The trace back unit may include a second memory outputting the transmission data determined by the fast clock. The second memory may receive the scaled clock for storing the path metric.

In accordance with example embodiment of the present application, the scaled clock may not be interrupted, thereby minimizing power consumption for bit-level processing operation.

BRIEF DESCRIPTION OF THE DRAWINGS

The above and other features and advantages will become more apparent by describing in detail example embodiments thereof with reference to the attached drawings in which.

DETAILED DESCRIPTION OF EXAMPLE EMBODIMENTS

Detailed example embodiments are disclosed herein. However, specific structural and functional details disclosed herein are merely representative for purposes of describing example embodiments. Accordingly, example embodiments are capable of various modifications and alternative forms. It should be understood, however, that there is no intent to limit example embodiments to the particular forms disclosed, but on the contrary, example embodiments are to cover all modifications, equivalents, and alternatives falling within the scope of the application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used here, the term "and/or" includes any and all combinations of one or more of the associated listed items.

The terminology used herein is for the purpose of describing particular embodiments only and is not intended to be limiting. As used here, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Example embodiments will now be described more fully with reference to the accompanying drawings. This invention, however, may be embodied in many different forms and should not be construed as limited to example embodiments set forth herein. Rather, example embodiments are provided so that this disclosure will be thorough and complete, and will fully convey the scope of the application to those skilled in the art. In the drawings, like numbers refer to like elements throughout.

Examples of UWB radio transceivers are disclosed in "*A CHANNELIZED DIGITAL ULTRA WIDEBAND RECEIVER*" by W. NAMGOONG (IEEE Transaction on Wireless Communications, pp. 502~510, Vol. 2, No. 3, May 2003), "*AN INTEGRATED, LOW POWER, ULTRA-WIDEBAND TRANSCEIVER ARCHITECTURE FOR LOW-RATE, INDOOR WIRELESS SYSTEMS*" by I. O'DONELL (Proc. of IEEE Circuits and Systems Workshop on Wireless Communications and Networking, September 2002), and "*DIGITAL ARCHITECTURE FOR AN ULTRA-WIDEBAND RADIO RECEIVER*" by R. BLAZQUAZ, F. S. LEE, D. WENTZLOFF, P. NEWASKAR, J. D. POWELL, A. P. CHANDRAKASAN (IEEE Vehicular Technology Conf., October 2003), the entire contents of which are incorporated herein by reference.

Figure 4:
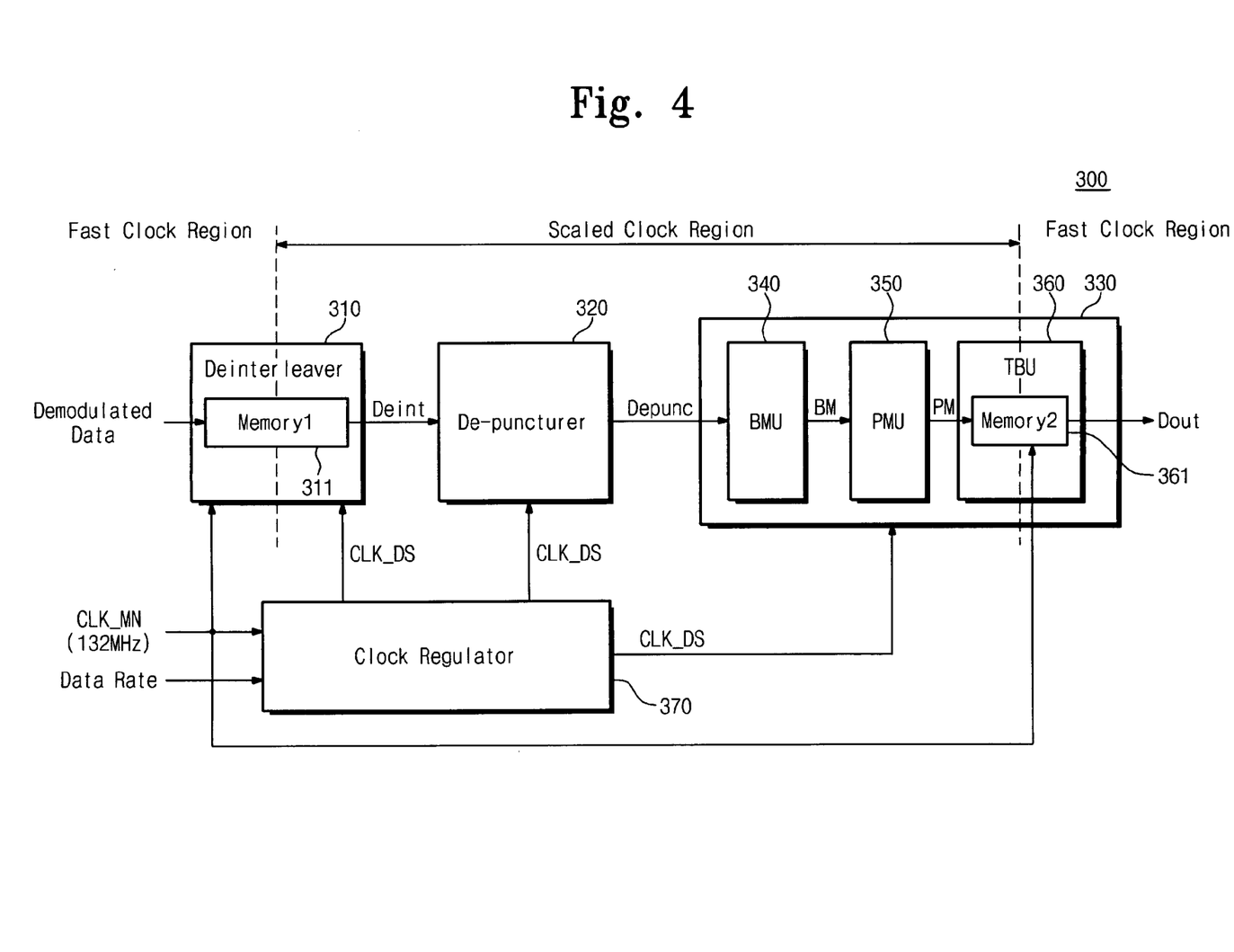
FIG. 4 is a block diagram of a bit-level processing unit according to an example embodiment of the present application.

FIG. 4 is a block diagram illustrating a bit-level processing unit 300 within a UWB system according to an example embodiment of the present application. The bit-level processing unit 300 may demodulate the OFDM symbols into bit-level data, where the received OFDM symbols were previously demodulated through an OFDM demodulating unit. An OFDM demodulating unit may demodulate a UWB signal into OFDM symbols. Referring to FIG. 4, the bit-level processing unit 300 may receive demodulated data in the form of OFDM symbols. The bit-level processing unit 300 may include a de-interleaver 310, a de-puncturer 320, and a Viterbi decoder 330. The bit-level processing unit 300 further includes a clock regulator 370 capable of providing various frequencies corresponding to a certain data rate (e.g., a data transmission speed).

The de-interleaver 310 may receive demodulated data from the OFDM demodulating unit. The de-interleaver 310 may realign data that was previously interleaved by the transmitter. For example, data may be often transmitted with error control bits that enable the receiver to correct a certain number of errors that occur during transmission. If a burst error occurs, too many errors can be made in a data signal, and that data signal may not be correctly decoded. To reduce the effect of such burst errors, the bits of a data signal may be interleaved before being transmitted. Therefore, a burst error may affect only a correctable number of bits in each data signal. In the receiver, the de-interleaver 310 may realign data in the reverse sequence in order to correctly decode the data, for example.

The de-interleaver 310 may include a first memory 311. The first memory 311 may include a register or a static random access memory (SRAM). Referring to FIG. 4, demodulated data is stored in the first memory 311 in response to a clock frequency of the fast clock CLK_MN. The fast clock CLK_MN may operate with a frequency of 132 MHz, for example. The first memory 311 may output de-interleaved data Deint in response to a scaling clock CLK_DS provided from a clock regulator 370. The frequency of the scaling clock CLK_DS is determined by a corresponding data rate. Referring to FIG. 4, devices within the scaled clock region may be driven by the scaled clock CLK_DS with a scaled frequency provided from the clock regulator 370. Devices within the fast clock region may be supplied by a fast clock CLK_MN.

The de-puncturer 320 may receive de-interleaved data Deint. The de-puncturer 320 may restore the compressed data of the de-interleaved data Deint in response to the scaled clock CLK_DS. The de-puncturer 320 may output restored data Depunc to the Viterbi decoder 330.

The Viterbi decoder 330 may receive the restored data Depunc from the de-puncturer 320. The Viterbi decoder 330 may estimate and determine transmission data according to a Viterbi algorithm. A Viterbi algorithm conducts a maximum likelihood decoding operation according to a trellis diagram. The Viterbi algorithm may decode convolution-coded data by selecting the optimum path by means of the trellis diagram.

The Viterbi decoder 330 may include a branch metric unit 340, a path metric unit 350, and a trace back unit 360. The branch metric unit 340 may generate a branch metric BM for a trace back operation to find the optimum path. The path metric unit 350 may receive the branch metric BM and summarize branch metrics to calculate the optimum path to each node. The path metric unit 350 may input the branch metric BM and update a path metric PM corresponding to states of the trellis diagram.

A trace back unit 360 may generate decision vectors based on the path metric output PM from the path metric unit 350. The trace back unit 360 may include a second memory 361. The decision vectors may be stored in the second memory 361 and the trace back unit 360 selects the original data chain based on the decision vectors. The Viterbi decoder 330 outputs the transmission data Dout.

The Viterbi decoder 330 may be included in the fast clock region and the scaled clock region. Therefore, the Viterbi decoder 330 may receive the fast clock CLK_MN and the scaled clock CLK_DS. The Viterbi decoder 330 may use the scaled clock CLK as a drive clock for calculating the branch metric BM, the path metric PM, and storing the path metric PM into the second memory 361. The second memory 361 may output Dout in response to the fast clock CLK_MN.

The clock regulator 370 may generate the scaled clock CLK_DS in response to the fast clock CLK_MN. The scaled clock CLK_DS may be generated by detecting a data rate of received data, corresponding to each data rate mode. For example, when a PSDU is transferred in a relatively low data rate, the bit-level processing unit 300 may be supplied with the scaled clock CLK_MN of a relatively low frequency. Example embodiments of the present application regarding the frequencies of the scaled clock CLK_DS generated from the clock regulator 370 will be explained with reference to FIG. 5.

Figure 5:
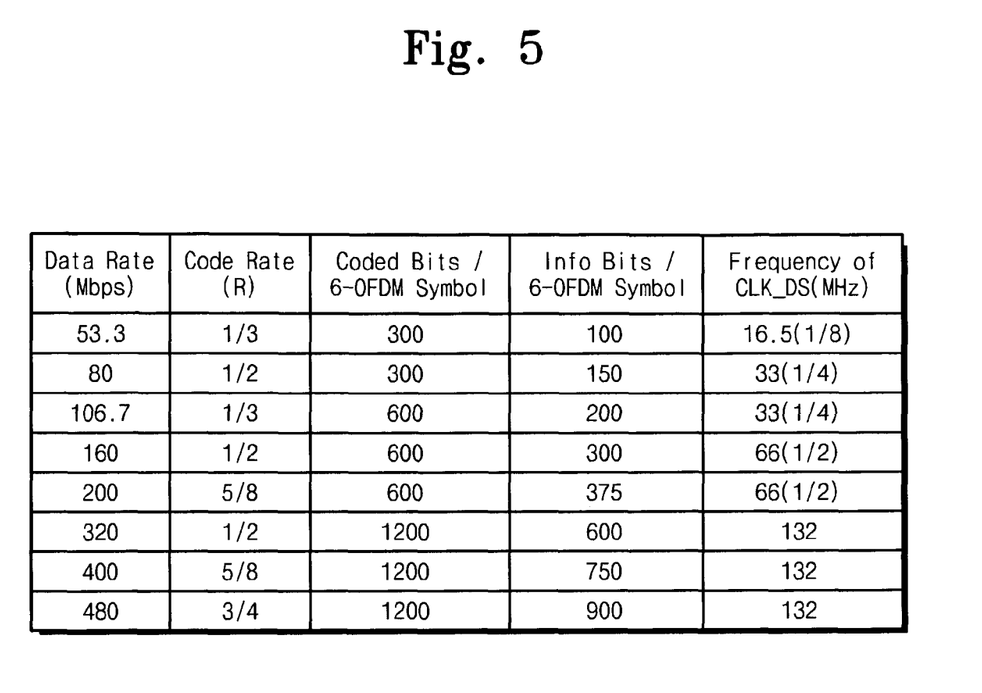
FIG. 5 illustrates scaled clock frequencies according to an example embodiment of the present application.

FIG. 5 is a table illustrating frequencies of the scaled clock CLK_DS corresponding to different data rates. Referring to FIG. 5, if a data rate is 53.3 Mbps (mega-bytes per second), the clock regulator 370 may generate a scaled clock CLK_DS of 16.5 MHz. If the data rate is 80 Mbps or 106.7 Mbps, the clock regulator 370 may generate the scaled clock CLK_DS of 33 MHz. If the data rate is 160 Mbps or 200 Mbps, the clock regulator 370 may generate the scaled clock CLK_DS of 66 MHz. If the data rate is over 320 Mbps, the clock regulator 370 may generate the scaled CLK_DS of 132 MHz. The scaled clock CLK_DS of 132 MHz may be generated without adjusting the fast clock CLK_MN. It is noted that the values used throughout this specification are for explanatory purposes only. However, other values may be used within the scope of the example embodiments.

Figure 6:
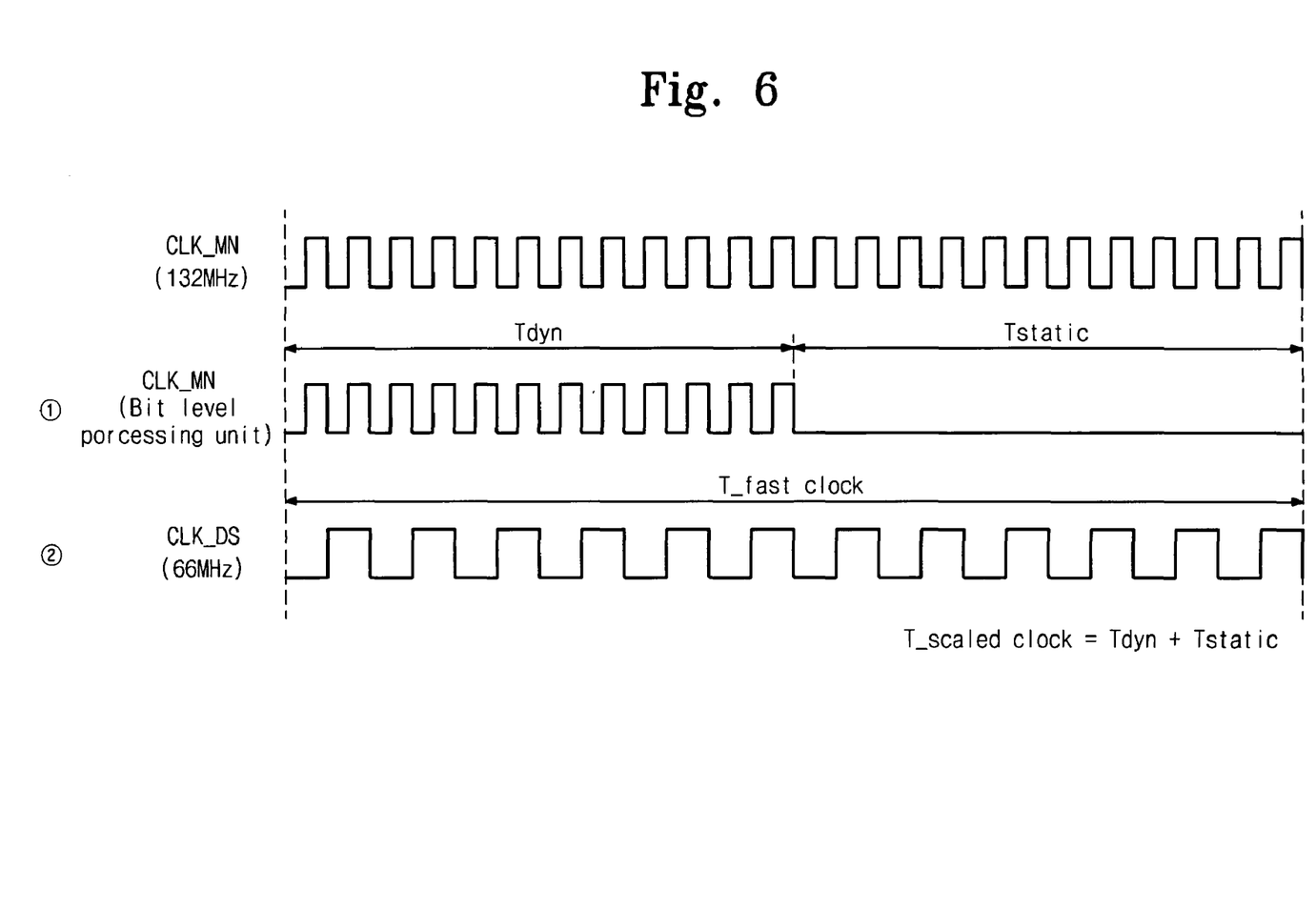
FIG. 6 is a timing diagram illustrating operations of clock frequencies according to an example embodiment of the present application.

FIG. 6 is a timing diagram illustrating a clock operation of the bit-level processing unit 300 depicting operations of the scaled clock CLK_DS and the fast clock CLK_MN. Two different cases are depicted in FIG. 6. First, the fast clock CLK_MN with a frequency of 132 MHz may be supplied to the bit-level processing unit 300 (①). Second, the scaled clock with the scaled frequency 66 MHz may be supplied to the bit-level processing unit (②). Referring to the non-scaled fast clock CLK_MN, data processing functions of the bit-level processing unit 300 (e.g., de-interleaving, de-puncturing, and Viterbi decoding) may be activated during an operation period Tdyn. If the data rate is 160 Mbps or 200 Mbps, the data processing operations of the bit level processing unit 300 may be terminated at time T_fast clock. If the non-scaled fast clock CLK_MN is applied to all function blocks of the receiver and the data rate is relatively low, there may exist an inactive period of time Tstatic because the data processing functions of the bit-level processing unit 300 may be complete at time T_fast clock. During the inactive period, the bit-level processing unit 300 may interrupt clock supply. Although the clock may be interrupted, the bit-level processing unit 300 may suffer from static power consumption due to leakage currents from devices forming the clock path.

As opposed to static power consumption, dynamic power consumption may be proportional to the number of cycles generated through the bit-level processing unit 300 during the operation period Tdyn. The dynamic power consumption may be dependent on the number of cycles the clock supplies. The number of clock cycles consumed for processing the same amount of data may be the same regardless of frequency. In other words, an amount of dynamic power dissipated during the operation period Tdyn in the case of non-scaled frequency (①) may be theoretically identical to an amount of power dissipated during the operation period T_scaled clock of the case ②, where the drive clock is scaled (i.e., CLK_DS=66 MHz). The number of cycles of the scaled clock CLK_DS during operation period T_scaled clock may be equal to the number of cycles of the fast clock CLK_MN during Tdyn. Therefore, the same amount of dynamic power dissipation is the same for the scaled clock CLK_DS and the fast clock CLK_MN.

In the case of the scaled clock CLK_DS operating at 66 MHz, the amount of static power consumption may be reduced or eliminated because the clock has not been interrupted and there exist no inactive period. For example, in the case of the scaled clock CLK_DS, operations of the bit-level processing unit 300 may continue throughout the period T_scaled clock. The reduced power dissipation may improve performance of the receiver in a UWB radio communication system.

While example embodiments have been shown and described with reference to FIGS. 4-6, it will be understood by those skilled in the art that various changes in form and details may be made therein without departing from the spirit and scope of this disclosure.

What is claimed is:

1. A method for demodulating an ultra-wide band (UWB) signal, comprising:
   receiving a fast clock signal corresponding to a maximum data rate of a plurality of data rates;
   detecting a data rate of the UWB signal among of the plurality data rates;
   selecting a clock signal from a plurality of clock signals in response to the detected data rate, wherein the plurality of clock signals includes at least one frequency different from other frequencies; and
   decoding the UWB signal in accordance with the selected clock signal and outputting transmission data in accordance with the fast clock signal.

2. The method of claim 1, wherein the UWB signal is a signal modulated in multi-band OFDM mode.

3. The method of claim 1, wherein the UWB signal is a signal modulated in 6-OFDM mode.

4. The method of claim 1, wherein decoding the UWB signal includes:
   de-interleaving the UWB signal;
   de-puncturing the de-interleaved data; and
   decoding the de-punctured data in accordance with a Viterbi algorithm.

5. A receiver for an ultra-wide band (UWB) signal, comprising:
   an OFDM demodulating unit demodulating the UWB signal into an OFDM symbol;
   a bit-level processing unit demodulating the OFDM symbol into bit-level data, wherein the bit-level processing unit receives a scaled clock signal having a frequency corresponding to one of a plurality of data rates of the UWB signal and a fast clock signal corresponding to a maximum data rate of the plurality of data rates; and
   a clock regulator generating the scaled clock signal from one of a plurality of clock signals corresponding to the one of a plurality of data rates,
   wherein the bit-level processing unit demodulates the OFDM symbol according to the scaled clock and outputs the bit-level data according to the fast clock signal.

6. The receiver of claim 5, wherein the plurality of data rates includes 53.3 Mbps, 80 Mbps, 106.7 Mbps, 160 Mbps, 200 Mbps, 320 Mbps, 400 Mbps, and 480 Mbps.

7. The receiver as set forth in claim 5, wherein the fast clock signal has a frequency of 132 KHz.

8. The receiver of claim 5, wherein the clock regulator outputs the scaled clock signal of 16.5 MHz if the data rate is 53.3 Mbps, the scaled clock signal of 33 MHz if the data rate is 80 Mbps or 106.7 Mbps, the scaled clock signal of 66 MHz if the data rates is 160 Mbps or 200 Mbps, and the scaled clock signal of 132 MHz if the data rates is 320 Mbps, 400 Mbps, or 480 Mbps.

9. The receiver of claim 5, wherein the bit-level processing unit comprises:
   a de-interleaver operating to de-interleave the OFDM symbol;
   a de-puncturer operating to decompress de-interleaved data; and
   a Viterbi decoder operating to the de-punctured data in accordance with a Viterbi algorithm.

10. The receiver as set forth in claim 9, wherein the de-interleaver receives the OFDM symbol in response to the fast clock signal and outputs the de-interleaved data in response to the scaled clock signal.

11. The receiver of claim 9, the de-interleaver further comprising:
  a first memory storing the OFDM symbol in response to the fast clock signal and outputting the de-interleaved data in response to the scaled clock signal.

12. The receiver of claim 11, wherein the first memory is a static random access memory.

13. The receiver of claim 9, wherein the Viterbi decoder comprises:
  a branch metric unit generating a branch metric;
  a path metric unit generating a path metric; and
  a trace back unit determining transmission data.

14. The receiver of claim 13, wherein the branch metric and the path metric is based on the scaled clock.

15. The receiver of claim 13, wherein the trace back unit comprises:
  a second memory outputting the transmission data based on the fast clock signal.

16. The receiver of claim 15, wherein the second memory receives the scaled clock signal for storing the path metric.

17. The receiver of claim 5, wherein the scaled clock signal is not interrupted.

* * * * *